United States Patent Office 3,270,262
Patented August 30, 1966

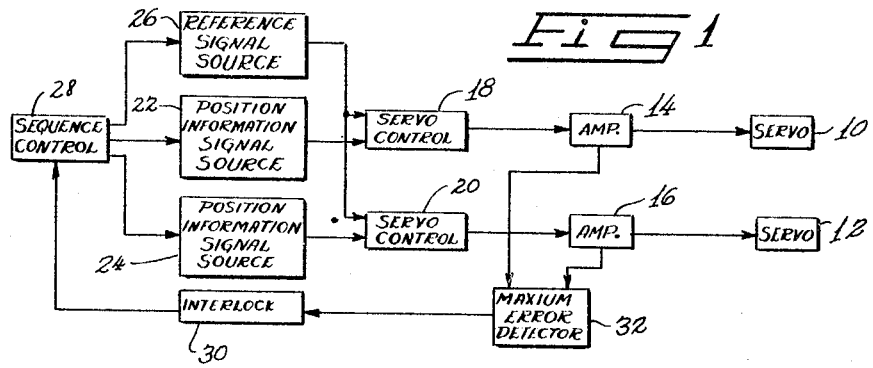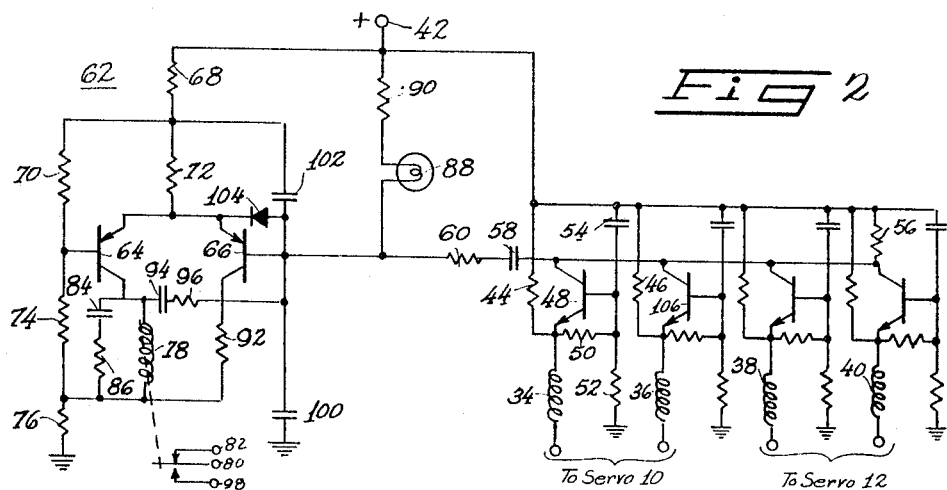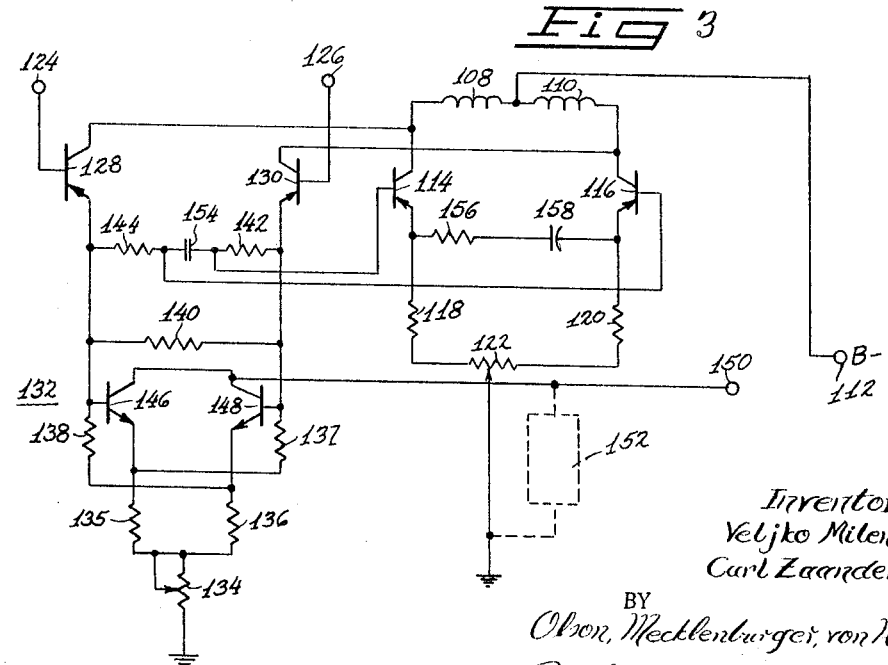

3,270,262
MAXIMUM ERROR SIGNAL DETECTOR FOR A SERVO CONTROL AND A CIRCUIT OVERRIDE RESPONSIVE THERETO
Veljko Milenkovic, Norridge, and Carl Zaander, Clarendon Hills, Ill., assignors to American Machine & Foundry Company, a corporation of New Jersey
Filed Dec. 19, 1962, Ser. No. 245,823
9 Claims. (Cl. 318—19)

This invention relates to a maximum signal detector, and more particularly to a detector capable of indicating when any of a number of different signals has an amplitude in excess of a predetermined value. Such a detector is useful as a control mechanism in an automatic program controlled machine, and operates to prevent damage to the apparatus in the event of a faulty signal condition controlling the apparatus.

The present invention is specifically designed to be associated with control apparatus such as that described in an application of Johnson et al. Serial No. 129,074, filed August 3, 1961, for "Sequence Control System."

Application Serial No. 129,074 discloses a sequence control system adapted for controlling an automatic program-controlled machine, such as that disclosed in an application of Johnson et al. Serial No. 43,090, filed July 15, 1960, now Patent No. 3,213,649, the program of which is controlled by apparatus such as that disclosed in an application of Milenkovic Serial No. 127,971, filed July 31, 1961. In the operation of such a machine, a movable arm is operated in a plurality of modes by servo units, each of which is responsive to an error signal indicative of the positional error of the movable arm in its mode. In the event of a malfunction of the system, an excessively large error signal may be produced. If such a large signal is permitted to operate the servo unattenuated, the movable arm operated by the servo would be violently moved which could over-stress the equipment and cause destruction to life and property.

In the operation of the programming system described in the Milenkovic application, an error signal is produced in response to two pulses, referred to therein as A and B pulses in order to operate a servo. The A pulse has a standard length, while the length of the B pulse is indicative of the position of the movable arm in relation to the position determined by the program. The error signal is produced by subtracting the length of one pulse from the other in order to determine the magnitude and direction of the positional error. When the B pulse is longer than the A pulse, the positional error is in a first direction and when the B pulse is shorter than the A pulse, the positional error is in the opposite direction. The B pulses are initiated (or synchronized) at the same time during each cycle by clock pulses which are independent of the position of the movable arm. Thus if the movable arm is held stationary for any reason, while the program calls for movement of the arm in a first direction, the length of the B pulse grows until it reaches its maximum permissible length. At this point, the length of the B pulses changes immediately to its minimum permissible length but the system has lost registry. Similarly, if the program calls for movement in the opposite direction while the arm is held stationary, the B pulses decrease and then change rapidly from minimum length to maximum length. The quick transition between limits of the length of the B pulses produces an error signal having a sharp discontinuity, after which the position of the movable arm cannot be accurately controlled by the program control mechanism. The occurrence of such a discontinuity is marked by its rapid rate of change.

Accordingly, it is an important object of the present invention to provide a maximum error detecting circuit which is responsive to the magnitude of an error signal to disable the controlled mechanism from responding to such error signal when such magnitude exceeds a predetermined level.

Another object of the invention is to provide a maximum error signal detecting circuit which is responsive to the rate of change of the magnitude of an error signal to disable the controlled mechanism from responding to such error signal when such rate exceeds a predetermined level.

A further object of the present invention is to provide a transistorized maximum error detector for detecting an abnormal condition of an error signal represented by current flowing through any of a number of servo units, and for inhibiting the operation of such servo units when such an abnormal condition is detected.

Further and additional objects of this invention will become manifest from a consideration of this specification, the accompanying drawing, and the appended claims.

In one embodiment of the present invention, there is provided a transistor detector associated with each actuating coil of each servo unit of a program-controlled machine. Each of the servo coils has a resistor connected in series therewith, and the transistor is responsive to the voltage developed across the resistor, and the time integral of such voltage, to conduct when the rate of increase of such voltage exceeds the threshold value of the circuit, which is determined in accordance with a safe level within the electrical and physical limitations of the machine. When any of the detector transistors conduct, a pulse is supplied to a monostable multivibrator to cause it to switch to its unstable condition, during which a relay coil is de-energized to permit interlock contacts to open within the control section of the machine.

In another embodiment, the detecting transistors are responsive to the amplitude of the error signals applied to the servos, and not to the rate of change of such signals.

For a more complete understanding of the present invention, reference is made to the accompanying drawings in which:

FIG. 1 is a functional block diagram of a program-controlled machine incorporating a maximum signal detector embodying the present invention.

FIG. 2 is a schematic diagram of a first embodiment of a maximum error detector embodying the present invention; and FIG. 3 is a schematic illustration of a second embodiment of a maximum error detector embodying the present invention.

Referring now to FIG. 1 of the drawings, two servo units 10 and 12 are provided to control the movements of corresponding movable members within a program-controlled machine. The servos are preferably similar to those described in the aforementioned Johnson et al. application Serial No. 43,090. Although only two of the servo units 10 and 12 have been illustrated, it will be appreciated that any number of like servo units may be employed in such a program-controlled machine. Each of the servo units 10 and 12 is controlled by an error signal from an amplifier 14 or 16, respectively, which amplifiers serve to amplify signals received from servo control units 18 and 20 respectively. Each of the servo control units 18 and 20 is responsive to a signal from an individual position information signal source 22 and 24 respectively. In addition, each of the servo control units 18 and 20 is responsive to a signal from a reference signal source 26, so that each error signal which controls the servo units 10 and 12 is a function of position information signals individual to each of the servos and, also reference signals which are common to all of the servos.

A sequence control unit 28 controls the sequence of operations of the program-controlled machine, through controlling the signal sources 22, 24 and 26.

All of the structure thus far described in general is illustrated and described in detail in the aforementioned applications of Johnson et al. and Milenkovic.

An interlock unit 30 is connected to the sequence control unit 28 and to a maximum error detector 32 for disabling the sequence control unit 28 in response to a signal received from the maximum error detector 32. The maximum error detector 32 is responsive to the output of each of the amplifiers 14 and 16 and provides a signal to the interlock 30 when the rate of increase, or the magnitude, of the error signal provided by one of the amplifiers 14 and 16 to its respective servo 10 and 12 exceeds a predetermined value.

Referring now to FIG. 2, one embodiment of the maximum error detector 32 is illustrated. The coils 34, 36, 38, and 40 are illustrative of the coils which effect the operation of the servo units 10 and 12 illustrated in FIG. 1, preferably by controlling the position of an hydraulic servo valve. Coils 34 and 36 are both associated with servo 10 while coils 38 and 40 are both associated with servo 12. The operation of each of the servos 10 and 12 is bidirectional, each single direction of operation being controlled by one of its two respective coils. Servo 10, for example, is caused to move in one direction when the coil 34 has more current flowing through it than through the coil 36, while the greater current flowing through the coil 36 effects the operation of the servo 10 in the opposite direction. The coils 34 and 36 correspond to the two coils of servo unit 420 illustrated in FIG. 6 of the aforementioned Milenkovic application.

One side of the coil 34 is connected to a source 42 of positive voltage through a resistor 44, and the other side is connected to the anode of a vacuum tube (not shown), such as the triode 414 in FIG. 6 of the aforementioned Milenkovic application.

Similarly, one side of the coil 36 is connected to the source 42 through a resistor 46 and the other side is connected to a second vacuum tube (not shown), such as the triode 416 illustrated in FIG. 6 of the Milkenkovic application. The two vacuum tubes connected to the coils 34 and 36 are driven in push-pull arrangement so that as the current through one of the coils 34 or 36 increases, the current through the other decreases, dependent upon the direction in which the servo 10 is to be moved.

The coils 38 and 40 of the servo 12 are similarly connected to another pair of vacuum tubes (not shown).

A transistor 48 has its emitter connected to the junction of the resistor 44 and the coil 34, and its base connected to a junction between two additional resistors 50 and 52, which are connected in series between the emitter of the transistor 48 and ground. The base of the transistor 48 is also connected by a capacitor 54 to the source 42. The potential at the emitter of the transistor 48 is, therefore, proportional to the magnitude of current flowing through the coil 34.

The resistor 50 and the capacitor 54 together form an integrator circuit, which operates to apply to the base of the transistor 48 a signal which corresponds to the time integral of the signal present at the emitter of the transistor 48. The resistor 52 is provided to permit some steady state current to flow through the resistor 50, to provide a predetermined amount of bias between the base and emitter of the transistor 48.

When the servo 10 is being programmed to remain in a stationary condition and the machine is not moving, the error signal remains constant and very small, and a constant current flows through the coil 34. A constant current also flows through resistors 50 and 52, and the voltage drop across the resistor 50 maintains the emitter of the transistor 48 positive in relation to its base. The capacitor 54 is charged to a potential which is the difference between the potential of the source 42 and the potential on the base of the transistor 48, so that in the steady state conditon, no current flows through capacitor 54.

Assume now that the gate tube connected to the coil 34 is energized so that an increased amount of current flows through the coil 34, causing the servo 10 to be controlled to move its associated movable arm in a first direction. The increased current flows through the resistor 44, dropping the voltage at the emitter of the transistor 48. The voltage at the junction of resistors 50 and 52 also tends to decrease, but cannot do so rapidly because the capacitor 54 resists any sudden change of potential across it. The voltage at the base of the transistor 48 gradually decreases, however, in a manner corresponding generally to the time integral of the signal present at the emiter of the transistor 48, as the charge on capacitor 54 increases by virtue of the current flowing through the resistor 50. If the increase in current through the coil 34 is gradual, the capacitor 54 is able to change its charge rapidly enough to lower the potential of the base of the transistor 48 to maintain the transistor 48 nonconductive. However, if the current through the coil 34 increases at a more rapid rate, the voltage of the emitter of the transistor 48 falls faster than the voltage at the base of the transistor 48, and accordingly the transistor is driven into conduction. The potential at the base of the transistor 48, therefore, changes at a time rate proportional to the difference in potential between the base voltage and a proportion of the emitter voltage determined by the ratio of values of resistors 50 and 52, which are connected as a voltage divider.

The minimum or threshold rate of increase of current through the coil 34 which renders the transistor 48 conductive depends upon the time constant of the integrator circuit including the capacitor 54. Rates exceeding such minimum or threshold rate must persist long enough to permit the potential at the emitter to be lowered at least by the amount of steady state bias potential provided by the resistors 50 and 52. If the time constant of the circuit including resistors 50 and 52 and capacitor 54 is made large, the rate of current increase and total current change required before the transistor 48 is driven into conduction is relatively great. If the time constant is small, however, a relatively low rate will cause the transistor 48 to conduct. Similarly, if the value of the resistor 50 is small, the steady state bias is low and relatively low amplitude signals cause the transistors 48 to conduct. But if the value of the resistor 50 is large compared to that of resistor 52, relatively large signals are required to cause the potential of the emitter of the transistor 48 to fall below its base potential. The values of resistors 50 and 52 and capacitor 54 are chosen to permit the transistor 48 to be driven into conduction before damage can be inflicted upon the machine by a faulty error signal, and are of necessity different for each different machine. The circuit is not responsive to rates of increase of current through the coil 34 encountered in normal operation, nor to high rates of extremely short duration, as, for example, noise pulses, as long as the amplitude of such noise pulses does not exceed the steady state emitter-base bias of the transistor 48.

When the transistor 48 is driven into conduction, a current flows from the source of positive voltage 42 through a resistor 56, thence through the collector and the emitter of the transistor 48 and through the coil 34. The voltage drop through the resistor 56 produces a negative voltage pulse at the collector of the transistor 48, which pulse is passed through a blocking capacitor 58 and a voltage divider including resistors 60 and 90, and a thermistor 88, to a filter network including the resistor 60 and the capacitor 100, the output of this network is connected to the input of a monostable multivibrator indicated generally at 62.

The monostable multivibrator 62 includes a normally conducting transistor 64 and a normally nonconducting transistor 66. A voltage dividing network including series connected resistors 68, 70, 74 and 76 is connected from the source 42 to ground. The junction of the resistors 70 and 74 is connected to the base of the transistor 64, and the junction of resistors 68 and 70 is connected through a resistor 72 to the emitter of both of the transistors 64 and 66. In the nomal stable condition of the monostable multivibrator 62, a current flows through resistors 68 and 72 to the emitter of the transistor 64, and from the base of the transistor 64 through resistors 74 and 76 to ground. The collector of the transistor 64 is connected through a relay coil 78 to the junction of resistors 74 and 76, so that a current normally flows through the relay coil 78 to normally close a movable relay contact 80 against an upper stationary relay contact 82. A capacitor 84 and series resistor 86 are connected in parallel with the relay coil 78 so as to minimize contact chatter of the relay. A diode 104 limits the reverse base-emitter potential which may be applied to the transistor 66.

The transistor 66 is normally maintained nonconductive because its base is biased positive with respect to its emitter by the voltage drop across the resistor 72, which charges the capacitor 102 connected between the junction of the resistors 68 and 72 and the base of the transistor 66.

When the transistor 48 becomes conductive, however, the potential of the base of transistor 66 is lowered, driving the transistor 66 into conduction, after a short interval required to charge the capacitors 100 and 102, connected from the base of the transistor 66 to ground, and to the source 42 through a resistor 68, respectively. This interval is required to slow the response of the multivibrator 62, to discriminate against noise pulses which may cause the transistor 48 to conduct, but which cannot do damage to the program-controlled machine because of their short duration.

The transistor 66 conducts an emitter-base current through the resistors 68 and 72 to its emitter, and from its base through the resistor 60 and the capacitor 58 to the transistor 48. Collector current flows through the resistors 68 and 72 to the emitter of the transistor 66, and from its collector through the resistor 82 to the junction of the resistors 74 and 76. The increased current through the resistor 76 operates to raise the potential on the base of the transistor 64, thereby rendering the transistor 64 less conductive.

When the transistor 64 conducts less, current through the resistors 68, 72, and 76 is reduced as is current through coil 78. This produces a reduced voltage at the junction of the collector of transistor 64 and coil 78 which is applied to the base of transistor 66 to drive it to greater conduction so that the transistor 64 is driven to cut-off.

The capacitor 84 discharges through the relay coil 78 for a period dependent upon the time constant of the circuit including resistor 86 and capacitor 84 and selected to avoid spurious response and chattering.

The duration that the transistor 66 is maintained in its conductive state is dependent principally upon the time constant of the circuit including the capacitor 94, and resistor 96.

When the voltage across the relay coil 78 decreases, the circuit including the movable contact 80 and the upper contact 82 is opened and the circuit including the movable contact 80 and a lower relay contact 98 is closed. The contacts 80 and 82 are interlock contacts which, once having opened, disable the control mechanism of the machine. A preferred interlock circuit is shown in FIG. 11c of the aforementioned Johnson, et al. application Serial No. 129,074, in which the contacts 440, 442 and 444 are the interlock contacts. As described in that application, the opening of the interlock contacts causes the sequence control of the machine to be disabled until the machine is subsequently restarted by an operator.

The thermister 88 has an inverse temperature characteristic which compensates for changes in the operating point of the transistors under varying ambient conditions.

After a predetermined time, which depends upon the values of the circuit including the capacitor 94, and resistor 96, the capacitor 94 becomes fully charged, and the potential of the base of transistor 66 rises, thereby cutting off transistor 66 and permitting the transistor 64 to again become conductive. The relay coil 78 thereupon recloses contacts 80 and 82 and reopens its contacts 80 and 98, in readiness for a subsequent operation of the maximum error detector.

The circuit has thus far been described only in connection with the operation of the transistor 48. The operation of the circuit is, however, identical when an excessive signal is detected by any of the other individual detector circuits, as will now be described.

An identical transistor 106 is provided in association with the coil 36 of the servo 10. The transistor 106 is provided with associated circuitry which is identical to that of the transistor 48. However, it will be remembered that the coil 36 is driven in push-pull with the coil 34 and, therefore, the current flowing through the coil 36 is inverse to the current flowing through the coil 34.

Therefore, the transistor 106 is rendered conductive in response to a rapidly increasing current flowing through the coil 36, which occurs at a time when the current flowing through the coil 34 is decreasing. The collector of the transistor 106 is connected in common with the collector of the transistor 48 so that a current flowing through either of the transistors 48 and 106 produces the negative pulse required to operate monostable multivibrator 62. It is, therefore, apparent that the combined circuit including the coils 34 and 36 and the transistors 48 and 106 is responsive to excessive rates of change of current in either direction through the coils 34 and 36 so as to energize the monostable multivibrator 62 to control the interlock relay contacts 80 and 82.

The coils 38 and 40 associated with the servo 12 are connected in identical fashion as has been described with respect to the coils 34 and 36, and the collectors of their associated transistors are also connected in common with the collectors of transistors 48 and 160. It is, therefore, evident that the maximum error detector circuitry associated with the servo 12 will cause operation of the monostable multivibrator 62 in the same manner. It will be appreciated that any number of additional maximum error detector circuits may be provided in association with other servo units, each of the detector circuits having their collector circuits connected in common as illustrated.

Referring now to FIG. 3, there is illustrates a second embodiment of the present invention, which is particularly designed for operation with a servo unit being driven by a transistor amplifier.

A pair of servo coils 108 and 110 are illustrated which perform the same function as that of the servo coils 34 and 36 illustrated in FIG. 2. The two coils 108 and 110 are connected together and their junction is connected to a source 112 of negative potential. The opposite ends of the coils 108 and 110 are each connected to the collector of an individual transistor 128 and 130, the emitters of which are connected through the detector circuit 132 and the bases of which are connected to a pair of input terminals 124 and 126.

Like the coils 34 and 36 of FIG. 2, the coils 108 and 110 conduct equal currents in opposite directions when the servo unit controlled by the coils 108 and 110 is being programmed to remain stationary.

The transistors 128 and 130 are the driver transistors and either one is caused to conduct more heavily than the other in response to the potential at its base, an error signal being applied across the bases of the two transistors 128 and 130.

The emitters of the transistors 128 and 130 are connected to a maximum error detector indicated generally at 132, having an input resistor 140 connected between the emitters of the transistors 138 and 230.

The maximum error detector 132 includes the transistors 146 and 148 which have their collectors connected in common, like those of the transistors 48, 106, etc. of FIG. 2.

The bases of the two transistors 146 and 148 are connected to opposite ends of the resistor 140. The base of the transistor 148 is connected to the emitter of the transistor 146 by a resistor 137, and the base of the transistor 146 is connected to the emitter of the transistor 148 by a resistor 138. Each of the emitters of the transistors 146 and 148 is connected through an individual resistor 135 or 136 to a potentiometer 134, the other end of which is connected to ground.

When an error signal having a relatively positive potential is applied to the terminal 124, and a correspondingly negative potential is applied to the terminal 126, the transistor 128 is partially cut off and the transistor 130 becomes more conductive, and increased emitter current flows from ground through the potentiometer 134 and through the series connected resistors 135 and 137 to the emitter of the transistor 130. Reduced current flows throught the series connected resistors 136 and 138, since the transistor 128 is less conductive. Some of this current flows through the resistor 140 to the emitter of the transistor 130. Collector current flows from the collector of the transistor 130 through the servo coil 110 to the source 112, and the servo controlled by the coils 108 and 110 is therefore urged to move in the direction associated with increased current through the coil 110.

When the input signals applied to the terminals 124 and 126 are equal, the servo including coils 108 and 110 is being programmed to remain stationary. A current flows through the series connected resistors 136 and 138, and, under zero signal conditions, an equal current flows through the series connected resistors 135 and 137, thus holding the emitters of both of the transistors 146 and 148 at a potential positive relative to their respective bases. But when the degree of conduction of the transistors 128 and 130 is unbalanced these current sare not equal.

As long as the magnitude of the signal applied to the terminals 124 and 126 does not exceed a predetermined value, the maximum error detector 132 remains inoperative and both of the transistors 146 and 148 included in the maximum error detector 132 remain nonconductive. Both of the transistors 146 and 148 are normally cut off because of the manner in which their respective bases and emitters are connected.

When an error signal having a relatively positive potential is applied to the terminal 124, and a corresponding relatively negative potential is applied to the terimnal 126, a greater current is conducted through the series connected resistor 135 and 137 then through the series connected resistors 136, 138 and 140. Thus the potential at the emitter of the transistor 146 decreases while the potential at the base of transistor 146 increases, encouraging conduction of the transistor 146. The variation in the potential of the emitter and base of the transistor 148 are inverse and the transistor 148 remains cut off. If the degree of imbalance of the conduction of the transistors 128 and 130 is greater than the threshold value of the circuit, because of an excessively large error signal, the transistor 146 is driven into conduction, causing a negative pulse to be produced at the output terminal 150. The output terminal 150 is connected to a monostable multivibrator in the same manner as illustrated in FIG. 2.

In like manner, when the input signal applied to terminal 126 is relatively positive and the signal applied to terminal 124 is relatively negative, the transistor 128 becomes more conductive, increasing the flow of current through the coil 108 and causing the servo to move in the opposite direction. Similarly, the transistor 130 becomes less conductive. If the error signal applied to terminals 124 and 126 is excessive, transistor 148 becomes conductive and produces an output signal to the monstable multivibrator, which actuates the interlock.

The circuit including the transistors 114 and 116 is for the purpose of providing negative feedback in the servo coils 108 and 110. The collectors of the transistors 114 and 116 are connected respectively to the coils 108 and 110, and their emitters are connected by the resistors 118 and 120 to opposite arms of the potentiometer 122. The slider of the potentiometer 122 is connected to ground.

The bases of the transistors 114 and 116 are connected to the emitters of the driver transistors 130 and 128, through resistors 142 and 144, and a capacitor 154 is connected between the bases of the transistors 114 and 116. The two ends of the capacitor 154 are at the same potential when a balanced signal is applied to the input terminals 124 and 126. Therefore, the feedback transistors 114 and 116 also conduct equally, due to their symmetrical emitter connections.

When one of the terminals 124 or 126 is made negative relative to the other one, the charge on the capacitor 154 cannot change instantaneously, and so the feedback transistors 114 and 116 continue to conduct equally a short time after the input signal changes. During this time, however, the transistors 128 and 130 are free to energize the servo coils 108 and 110. As the capacitor 154 is charged, however, the feedback transistor which is connected to the servo coil 108 or 110 which is being predominantly energized by the driver transistors 128 or 130 has its degree of conduction reduced, while the conduction of the other feedback transistor is increased.

If a relatively negative potential is connected to the terminal 126, for example, the capacitor 154 gradually becomes charged by current flowing through the resistors 136 and 138 toward the emitter of the transistor 130. Thus the base potential of the transistor 114 is reduced, while that of the transistor 116 is made relatively greater. The transistor 114 is accordingly more conductive, and its collector current flows through the servo coil 108, while the collector current of the driver transistor 130 flows through the other servo coil 110. It will be appreciated that the feedback current does not become significant until after the time required to slightly charge the capacitor 154. This provides for more rapid response by the servo, by energizing the servo coils 108 and 110 with the full value of the input signal immediately after any sudden change, while negative feedback reduces the level of energization later. Thus, when the input signal changes, the servo is given a sharp pulse in the direction of the charge, in addition to the normal signal, to rapidly change the condition of the servo.

A capacitor 158 and a resistor 156 are connected between the emitters of the feedback transistors 114 and 116 to keep the potential difference between the emitters of the feedback transistors 114 and 116 approximately equal to the potential difference between their bases. This permits the proper negative feedback action when the polarity of the input signal applied to the terminals 124 and 126 is reversed. The time constant of the circuit including the capacitor 158 is, however, larger than that of the circuit including the capacitor 154.

The potentiometer 122 is adjusted for a balanced current condition in the servo coils 108 and 110 when equal signals are applied to the input terminals 124 and 126, and regulates the feedback current in the coils 108 and 110 to compensate for any unbalance in the circuit.

It will be appreciated that any number of additional maximum error detector circuits may be provided for other servos in addition to the one including the coils 108 and 110. Such additional maximum error detector units also have their collectors connected in common to those of the maximum error detector 32. The dashed rectangle 152 illustrates how such additional maximum error detector units may be connected.

The maximum permissible error signal which will not cause operation of the maximum error detector is determined by the ratios of the values of resistors 137 and 138 to the values of the resistors 135 and 136, respectively.

This is accomplished by adjusting the tap of the potentiometer 134, which is connected in common with the two series circuits including the resistors 137 and 138 respectively.

Without further elaboration, the foregoing will so fully explain the character of our invention that others may, by applying current knowledge, readily adapt the same for use under varying conditions of service while retaining certain features which may be properly said to constitute the essential items of novelty involved, which items are intended to be defined and secured to us by the following claims.

We claim:

1. In a program controlled machine having a plurality of movable members, the position of each member being controlled by a servo unit responsive to electrical signals, and a plurality of control units for furnishing the electrical signals to said servo units, each servo unit being responsive to signals from a different one of said control units, the combination comprising a plurality of threshold means for sensing said electrical signals to produce an output signal if any such signal exceeds a predetermined threshold level, each said threshold means sensing a different one of said signals, each said threshold means comprising a normally nonconducting transistor having a collector electrode and a control electrode; means for applying one of said electrical signals to the control electrode of each of said transistors; means connecting the collector electrodes of all said transistors in common; impedance means connected between a source of potential and said collector terminals, whereby said output signal is produced at said impedance means when any of said transistors is driven into conduction by its respective electrical signal; and inhibiting means connected to the common connection of said collector electrodes, said inhibiting means being operative to inhibit further operation of said program controlled machine in response to conduction of any of said transistors.

2. Apparatus according to claim 1, wherein a pair of said threshold means is provided for each of said servos, one of said pair being operative to generate an output signal when the electrical signal applied to its servo exceeds said threshold in one polarity sense, and the other of said pair being operative to generate an output signal when the electrical signal applied to its servo exceeds said threshold in the opposite polarity sense.

3. Apparatus according to claim 2, including means for applying normal and inverted wave forms of said electrical signal to each of said servo units, means for connecting said one threshold means of each said pair to said normal electrical signal, and means for connecting said other threshold means to said inverted electrical signal.

4. Apparatus according to claim 3, including means for connecting said signals to the bases of said first and second transistors, means connecting the collectors of said first and second transistors in common, first impedance means connected between the emitter of said first transistor and the base of said second transistor, second impedance means connected between the emitter of said second transistor and the base of said first transistor, third impedance means connected between the emitter of said first transistor and a point of reference potential, fourth impedance means connected between the emitter of said second transistor and said point, and fifth impedance means connected between said collectors and a source of potential, current normally flowing from said source in series through said first and third impedance means and from said source in series through said second and fourth impedance means to maintain both of said transistors cut off in the absence of said signals, said first transistors becoming conductive when said signals have an amplitude of one polarity greater than a predetermined threshold amplitude, and said second transistor becoming conductive when said signals have an amplitude of the opposite polarity greater than a predetermined amplitude.

5. In a program controlled machine of the type having a positionable member, a servo unit including a power drive portion for positioning the positionable member and an actuating portion for controlling the power drive portion, and a source of electrical command signals, the actuating portion of the servo unit being responsive to electrical command signals from the source to control the power drive portion, the combination comprising threshold circuit means for sensing command signals supplied to said actuating portion and for producing an output signal when any command signal exceeds a predetermined threshold, said threshold circuit means comprising a semiconductor electron valve having a first electrode, a second electrode and a third electrode, said first electrode being connected to the actuating portion of the servo unit; first resistive circuit means interconnecting said first electrode and a source of direct current; second resistance means interconnecting said first electrode and said second electrode; third resistance means interconnecting said first electrode and a point of reference potential; capacitive circuit means interconnecting said second electrode and the source of direct current, said capacitive circuit means being charged through a circuit including said second and said third resistive means, said capacitive circuit means being operative to change state of charge with changes in the command signal voltage sensed at said actuating portion below a preselected rate of change and magnitude of change, and being operative to provide an output signal at said third electrode when the sensed command voltage exceeds the preselected limits.

6. In a program controlled machine having a plurality of movable members, the position of each said member being controlled by a servo unit responsive to electrical signals, and a plurality of control units for furnishing said electrical signals to said servo units, each said servo unit being responsive to signals from a different one of said control units, the combination comprising a semiconductor electron valve having a first electrode, a second electrode and a third electrode; a source of voltage; first second and third impedance elements connected in series circuit relationship between said source of D.C. voltage and a point of reference potential, said first electrode of said valve and said actuating portion of said servo unit being connected to the junction of said first and second impedances, and said second electrode of said valve being connected to the junction of said second and third impedances, capacitive circuit means connected between said second electrode and said source of D.C. voltage for cooperating with said second impedance and said valve to integrate changes in voltage at said actuating means, said second impedance having a valve sufficiently large to prevent said capacitive circuit means from responding to changes in voltage having a rate greater than a preselected rate, said valve being responsive to such excessive rates to produce an output voltage at said third electrode.

7. In a program controlled machine of the type having a member movable to various positions, a servo unit operative to move the movable member, a control unit for furnishing electrical signals to the servo unit, and an actuating winding included in said servo unit responsive to the electrical signals from the control unit to control the operation of the servo unit, the combination comprising threshold circuits means directly connected to said actuating winding for sensing the electrical signals supplied to said winding and for producing an output signal in response to any such signal which exceeds a predetermined threshold level, said threshold means comprising a transistor having first and second control electrodes and an output electrode, means for connecting said electrical signals to said first control electrode, means for inverting said electrical signals and for connecting the inverted signals to said second electrode, biasing means connected to said first and second control electrodes for providing a bias potential to bias off said transistor in the absence of said signals, whereby said transistor becomes conductive and produces said output signal only when the difference between said electrical signals and said inverted signals exceeds said bias.

8. Apparatus according to claim 7, wherein said inhibiting means comprises means connected to said threshold circuit means to receive said output signal and to produce a control signal in response thereto, and an interlock relay connected to receive said control signal and be operated thereby, said control signal having a duration sufficient to enable said relay to operate irrespective of the duration of said output signal.

9. Apparatus according to claim 7, including filter means for delaying said output signal until said electrical signal which exceeds said threshold has persisted above said threshold for a predetermined time.

References Cited by the Examiner

UNITED STATES PATENTS

| | | | |
|---|---|---|---|
| 2,866,145 | 12/1958 | Peaslee et al. | 318—162 |
| 2,995,687 | 8/1961 | Mayberry | 317—148.5 |
| 3,056,909 | 10/1962 | Tripp | 318 |
| 3,101,436 | 8/1963 | Younkin | 318 |
| 3,108,263 | 10/1963 | Sylvander et al. | 318—18 X |
| 3,112,412 | 11/1963 | Dyer | 307—88.5 |
| 3,114,057 | 12/1963 | Caruso | 307—88.5 |
| 3,117,238 | 1/1964 | McNair | 307—88.5 |

ORIS L. RADER, *Primary Examiner.*

JOHN F. COUCH, *Examiner.*

T. LYNCH, *Assistant Examiner.*